Figure 1:
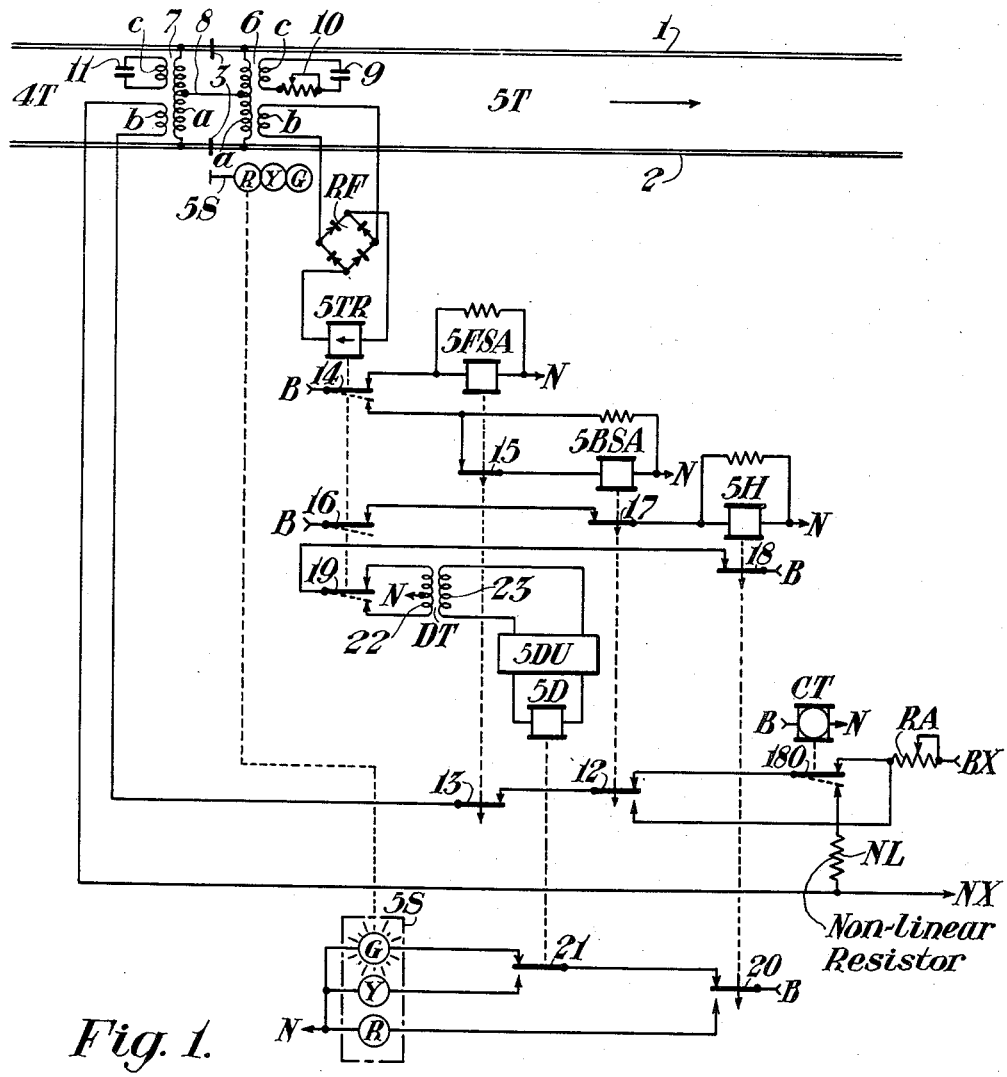

Sept. 30, 1958

C. E. STAPLES ET AL 2,854,567

RAILWAY TRAFFIC CONTROLLING APPARATUS

Filed April 23, 1954

INVENTORS
Crawford E. Staples and
Charles B. Shields.
BY
W. L. Strut
THEIR ATTORNEY

United States Patent Office 2,854,567
Patented Sept. 30, 1958

2,854,567

RAILWAY TRAFFIC CONTROLLING APPARATUS

Crawford E. Staples, Pittsburgh, and Charles B. Shields, Penn Township, Allegheny County, Pa., assignors to Westinghouse Air Brake Company, Wilmerding, Pa., a corporation of Pennsylvania Application April 23, 1954, Serial No. 425,206

12 Claims. (Cl. 246—34)

Our invention relates to railway traffic controlling apparatus of the type having track circuits employing coded or periodically interrupted current.

It has heretofore been proposed in connection with apparatus of the type described to provide means operable, in the event an insulated joint separating two track sections becomes defective, to establish a lockout circuit whereby steady, uncoded energy is supplied to the section in the rear of the defective joint. This steady energy then feeds over the defective joint and maintains the track relay of the section in advance steadily energized, thereby causing the signal controlled by that track relay to display its most restrictive indication.

Our invention is an improvement upon apparatus of the type shown, for example, in Letters Patent of the United States No. 2,263,253, issued November 18, 1941, to Howard A. Thompson for Railway Signaling Systems.

It is well known that when signaling systems are applied to railroads using electric propulsion, impedance bonds are required between adjacent track sections to provide a return circuit for the propulsion current. Where the electric propulsion is by direct current, the impedance of these bonds must be very small. Since it is the usual practice in such signal systems to use alternating current in the track circuits, the impedance bonds must then be tuned in order to keep the power requirements of the signal system low. This is true whether or not a coded track current is used. It has also been found, as an added advantage, that tuning the impedance bond at the relay end of any track circuit makes it possible to eliminate a separate resonant unit which would otherwise be required for the track relay. In addition, the windings for the track transformer, generally used to connect the source of the alternating current signaling energy to the rails, are incorporated into the impedance bond at the end of the track circuit from which the track current is supplied.

When coded track current is used, it has been found necessary to provide a low resistance shunting circuit across the feed end of each track circuit during the off period of the code to prevent an excessive on-time gain of the track relay which would render the system inoperable. The on-time gain of a code following track relay, or the on-time gain of a coded track circuit, as used herein, may be defined as the difference between the time the coding contact, at the supply end of the track circuit, is closed and the time the front, or energized position, contacts of the code following track relay, at the other end of the circuit, are closed, the relay contacts being closed for a longer period. On-time gain is sometimes referred to as "lagging front contacts" of the track relay. On-time gain is caused chiefly by energy storage in the track circuit which tends to lengthen the duration of each code pulse of current supplied to the rails. The track relay thus remains energized after the coding contact has opened. In alternating current track circuits of the type herein shown, the energy storage occurs as a result of the resonant circuits, which tend to continue oscillating after the coding contact has disconnected the source of power. The low resistance shunt applied across the supply-end impedance bond during the code off-time detunes this particular resonant circuit so that it no longer oscillates. This sharply reduces the energy storage in the track circuit and the track relay releases more quickly.

It has also been found preferable, in such coded signal systems for electric railways, to use a lockout circuit, similar to that shown in the previously mentioned Thompson patent, in order to detect defective insulated joints. This is important because, as will be discussed in detail hereinafter, the failure of only one insulated joint in this type of signal system permits a transformer action between the impedance bonds which results in the track relay of the track circuit in advance being energized by the current supplied to the track circuit to the rear. When such a lockout circuit is in use and a joint becomes defective as a train passes over it, the first pulse of energy supplied to the track circuit to the rear picks up the track relay for the advance section and causes the front contact repeater of this track relay to also pick up. This causes the apparatus to lock itself out under steady energy conditions. If the insulated joint becomes defective when no train movement is involved, the scrambled code received by the track relay, resulting from energy being fed over the defective joint as well as from the other end of the track circuit, will increase the on-time of the track relay to a point where the back contact repeater of that track relay will release and thus set up the lockout circuit.

However, when it is necessary to short circuit the feed-end impedance bond during the off-period of the code transmitter, as has been previously discussed, the impedance of the feed-end bond is so reduced that it acts as a short circuit on the track relay and the relay-end bond of the track circuit in advance during this off-period of the code. This causes the release of the advance section track relay, which then tends to follow only the code transmitted at the same location, thus preventing any detection of the defective insulated joint. Thus, it is desirable to have the shunting circuit, which is completed over an off-period contact of the code transmitter, include a circuit element which is of low impedance when coded energy is being fed through the feed-end bond to a track circuit effectively isolated from the adjacent advance track circuit by good insulated joints, and which is of high impedance when an insulated joint is defective.

Therefore, it is an object of our invention to provide railway traffic controlling apparatus with such an improved lockout circuit.

It is also an object of our invention, in railway traffic controlling apparatus of the coded track circuit type using tuned impedance bonds and having a controlled low on-time gain in the track circuit, to provide an improved lockout circuit.

Another object of our invention is to provide railway traffic controlling apparatus of the coded type, using tuned impedance bonds and having a low on-time gain control circuit, which apparatus is so arranged that the operation of the lockout circuit is identical whether a defective insulated joint occurs when a train is moving through the section or when the section is unoccupied.

Again, it is an object of our invention, in railway traffic controlling apparatus of the coded type having tuned impedance bonds and a low on-time gain control shunting circuit, to provide a nonlinear resistance means to insure proper operation of the lockout circuit under all conditions of track occupancy.

Other objects and features of our invention will be apparent from the following description taken in connection with the accompanying drawings.

In our invention we accomplish the above-described objects by inserting a nonlinear resistance means in the feed-end impedance bond shunting circuit which is required to keep down the on-time gain of the track circuit. It has been found that, when the track circuit being fed is in the normal condition, that is, with all insulated joints effective to separate the track sections, the voltage impressed on the primary winding of the track transformer, which is made part of the feed-end impedance bond, is relatively high, for example, of the order of 60 to 100 volts. If one insulated joint is defective, the voltage across the feed-end bond primary winding due to the track current flowing in the next track circuit in advance is of the order of 20 volts. In our invention, we select, in the present example, a nonlinear resistance means which readily passes current, that is, has a low resistance, when approximately 40 volts or more is applied across its terminals. Conversely, this nonlinear resistance means has a high resistance when less than 40 volts is applied. By including this nonlinear resistance means in the shunting circuit across the primary winding of the feed-end bond, when the track circuit is normal, a low impedance shunt is applied during the off-period of the code, voltage oscillations are suppressed, and the on-time gain is reduced. When an insulated joint fails, a high impedance shunt is applied during the off-period of the code, the relay-end bond and track relay of the section in advance are not short circuited, and that track relay will follow the resulting scrambled code, this type of operation resulting in lockout of the apparatus.

It is to be understood that the specific voltages recited in the preceding paragraph and hereinafter are examples only, and that our invention is applicable to other voltage ranges.

We shall now describe one form of railway traffic controlling apparatus embodying our invention, with one modification thereof, and shall then point out the novel features thereof in the appended claims.

In the accompanying drawings, Fig. 1 is a diagrammatic view of railway traffic controlling apparatus embodying our invention.

Figure 2:
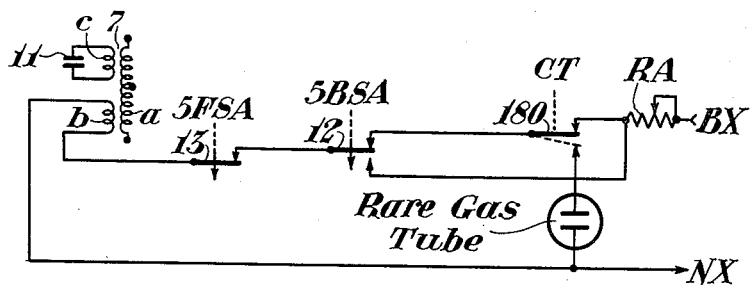

Fig. 2 of the drawings shows a portion of the circuit arrangement of Fig. 1 modified by using a rare gas tube to replace the nonlinear resistor utilized in Fig. 1.

Similar reference characters refer to similar parts in each of the drawings.

Referring now to Fig. 1, a pair of track rails 1 and 2 are shown forming a stretch of railway track over which traffic normally moves in the direction indicated by the arrow, that is, from left to right. The rails of this track stretch are divided by insulated joints 3 into the customary successive track sections. There is shown in Fig. 1, a portion of two such track sections identified as 4T and 5T. Each of the sections of the railway track has located at the entrance end thereof a signal for governing the movement of trains into that track section, the signal for section 5T being identified as 5S. The signal as illustrated is of the familiar color light type having a green or proceed lamp G, a yellow or caution lamp Y, and a red or stop lamp R.

The particular track stretch which is represented in the drawing is intended for use in a railway system employing electric current for propulsion purposes and for this reason the signal system utilizes alternating current track circuit energy together with impedance bonds of a usual form which conduct the propulsion current around each pair of insulated rail joints. In Fig. 1, at the junction of the track sections 4T and 5T, the rail impedance bonds 6 and 7 are shown for providing the propulsion current return circuit around the insulated joints 3 placed between the two mentioned track circuits. The impedance bond 6 may be further identified as being the relay-end bond for the track section 5T while impedance bond 7 may be also identified as the feed-end bond for track section 4T. The actual return circuit around the insulated joints for the propulsion current from both rails is provided by the winding $a$ of bond 6 and bond 7 and the connection 8 which joins the mid points of these two windings.

Especially where the electric propulsion is of the direct current type, the impedance bonds must be of very low impedance in the propulsion current return circuit. It then becomes necessary to tune the impedance bonds in order to keep the power requirements in the signaling circuits low enough for efficient operation. That is, the impedance bonds must be tuned to the frequency of the alternating current used in the signal circuits. For example, the impedance bond 6 is tuned to the signal current frequency by tuning its winding $c$ with capacitor 9 and resistor 10. Similarly, impedance bond 7 is tuned to the signaling frequency by tuning its winding $c$ with the capacitor 11. As will appear hereinafter, tuning of the relay-end impedance bond also eliminates the need for a separate, tuned resonant unit for use with the track relay since the bond itself may then serve as this tuned resonant unit.

The rails of each track section form a part of a track circuit to which coded, alternating current, signal control energy is supplied at the exit or leaving end from the secondary of a track transformer. Actually as shown, the track transformer is part of the impedance bond at the feed-end of the circuit, that is, the windings $b$ and $a$ of bond 7 form the track transformer for the track section 4T. The energy supplied to the track circuits is derived from any suitable source and may be distributed throughout the track stretch by a transmission line not shown. In the drawings, the reference characters BX and NX designate the terminals of such a power supply source. It may be assumed that the energy supplied from such a source is alternating current with a frequency of 100 cycles per second although it is to be understood that other frequencies may be used. The normal energy supply circuit for the track circuit of section 4T may then be traced from terminal BX of the source through limiting resistor RA, front contact 180 of a code transmitter CT, front contact 12 of a relay 5BSA, front contact 13 of a relay 5FSA, and primary winding $b$ of the track transformer or impedance bond 7 to terminal NX of the source. The voltage induced in winding $a$ by the current flowing in winding $b$ of bond 7 then supplies the actual track current in rails 1 and 2 for section 4T.

The track relay at the other end of section 4T is fed through the tuned resonant circuit which is part of the impedance bond as previously mentioned. The apparatus which is provided for the track relay end of the section 5T is similar to that which would be provided for the corresponding end of section 4T, and the illustrated arrangement will be described as an example. The track relay 5TR is a direct current, code following relay of the usual type. It is fed through the rectifier RF which in turn is fed from the secondary winding $b$ of the impedance bond 6. As was previously mentioned, the impedance bond 6 for this purpose acts as a tuned resonant unit with the primary of the resonant transformer being winding $a$ and the tuning accomplished using winding $c$. The track relay 5TR then will be responsive to whatever signaling energy is fed into the winding $a$ from the rails and induced from this winding into the winding $b$ and the rectifier RF. Normally, the energy is received only from the track rails 1 and 2 of the section 5T and is supplied from the feed end of the section 5T through a circuit similar to that already described for section 4T.

Each of the signal locations has associated therewith a suitable source of direct current energy such as a primary or storage battery not shown. However, the positive and negative terminals of this battery are identified in the drawing by the reference characters B and N, respectively.

At the particular signal location shown in Fig. 1, the track relay 5TR has associated with it several relays identified by the reference characters 5FSA, 5BSA, 5H, and 5D. In cooperation with the relay 5TR, these relays function to provide three indications on the signal 5S governing the movement of trains into the section 5T. For simplicity, it is assumed that the signal 5S is an approach signal to a home or controlled signal at the far end of the section 5T. For this reason, the signal 5S must show three indications and therefore two code speeds for the track current feeding the relay 5TR are required. In the present example it is assumed that the track current is interrupted, as conditions warrant, at the code rate of 75 or 180 times per minute. The 75 code rate is used to provide an approach indication or the yellow signal, while the 180 code rate is used to provide a clear or high speed indication, that is, the green signal. It is further assumed that to the rear of signal 5S, that is, through the section 4T, only the 180 code rate is required. This is used only to indicate a clear block between the last controlled signal, which displays only a green or a red indication and which may be at the far end of the section 4T or farther to the rear, and signal 5S. Such signal systems are well known and no further description is needed for an understanding of the present application.

The relay 5FSA is a front contact repeater of the track relay 5TR. It is energized by a circuit which may be traced from terminal B of the source through front contact 14 of relay 5TR and the winding of relay 5FSA to terminal N of the source. Similarly, the relay 5BSA is a back contact repeater of the relay 5TR and is energized by a circuit which may be traced from terminal B over back contact 14 of relay 5TR, front contact 15 of the relay 5FSA, and the winding of relay 5BSA to terminal N. Each of these two relays is snubbed by a resistor connected in multiple with the relay winding in order to retard the release of these relays. In other words, even though the contact 14 of the relay 5TR is coding to alternately close the front and the back contact, the relays 5FSA and 5BSA will remain in their picked-up position under this condition. It is to be noted, however, that the snubbing circuit for relay 5BSA includes front contact 15 of relay 5FSA. Release of relay 5FSA thus interrupts the snubbing circuit for relay 5BSA, and the latter relay will quickly release in that event.

The relay 5H is also energized at the same time over a circuit which may be traced from terminal B through front contact 16 of the relay 5TR, front contact 17 of relay 5BSA, and the winding of relay 5H to terminal N. This relay is also snubbed by a resistor connected in multiple with the relay winding to slightly retard its release so that it will hold up during code following action of the relay 5TR. The relay 5D is energized by a closed circuit which includes secondary winding 23 of a decoding transformer DT, a 180 decoding unit 5DU, and the relay winding. The primary winding 22 of transformer DT is energized over front contact 18 of relay 5H and front and back contacts 19 of relay 5TR. The operation of this particular circuit arrangement for relay 5D will be explained in more detail hereinafter.

The energizing circuits for the various lamps of the signal 5S are shown at the bottom of Fig. 1. The lamps shown at that location in Fig. 1, inside the conventional dot-dash rectangle used for the signal 5S, are identical with the lamps shown in the symbol for signal 5S adjacent to the track diagram itself, as is indicated by the dotted line connecting the two symbols. When the relay 5H is in its released position, which it occupies when no track current is being received or when the relay 5BSA has released under special conditions described shortly, the red lamp of the signal 5S is lighted, the circuit passing from terminal B over back contact 20 of the relay 5H through the red signal lamp to terminal N. The circuit for lighting the yellow lamp may be similarly traced from terminal B through front contact 20 of relay 5H, back contact 21 of relay 5D, and the yellow signal lamp to terminal N. To light the green lamp, both relays 5H and 5D must be energized since the lighting circuit includes front contact 20 of relay 5H and front contact 21 of relay 5D, the entire circuit being obvious from an inspection of the drawing.

It is believed that further operation of the apparatus shown in Fig. 1 can best be understood by a general description of the operation of the system. We shall assume first that normal conditions exist in the entire arrangement at this signal location. These conditions would include both insulated joints 3 being in good condition and the track current received through the rails of section 5T being coded at least at the 75 code rate. This condition would exist when the controlled signal at the home location at the far end of track section 5T is displaying its stop indication. The track relay 5TR under these conditions would be following the track current coded at the 75 code rate. The circuit at the illustrated location for energizing this relay, includes, in addition to the rails 1 and 2 of section 5T, windings a and b of the impedance bond 6, the bond serving in this case as a tuned resonant unit, rectifier unit RF, and the winding of relay 5TR.

Since the relay 5TR is operating at the 75 code rate, its front and back contacts 14 are alternately closed at this rate. As previously explained, this energizes the relays 5FSA and 5BSA so that they pick up. Because of the snubbing resistors on these two relays, they remain in the picked-up position, bridging the open circuit time as contact 14 is operated at the code rate. It is to be noted at this time that the on-time and off-time of the code rate, that is, the time when front contact 14 and back contact 14 are closed, respectively, must be relatively equal in length so that the relays 5FSA and 5BSA receive an approximately equal amount of energization. If this condition does not exist, one or the other of the relays will not receive sufficient energy to cause it to hold up during the open circuit time of the coding contact 14.

Assuming that both the relays 5FSA and 5BSA are in their picked-up position, the relay 5H is then energized over the previously traced circuit and picks up. Because of its snubbing resistor, this relay also remains in its picked-up position bridging the open circuit time of contact 16. Energy is now supplied to primary winding 22 of the decoding transformer DT, the top and bottom halves of the winding being alternately energized. The circuits may be traced from terminal B through front contact 18 of relay 5H, front contact 19 of relay 5TR and the upper half of primary winding 22, or back contact 19 and the lower half of primary winding 22, to terminal N. This alternate flow of current in opposite directions in the halves of primary winding 22 induces an alternating current of the code rate frequency in secondary winding 23 of decoding transformer DT. This alternating current flows through the decoding unit 5DU and thence through the winding of relay 5D. The decoding unit 5DU is of the well-known construction which includes a tuned circuit and a full-wave rectifier. In the unit 5DU, this tuned circuit is tuned to the 180 code rate, that is, 180 cycles per minute. Therefore under the present conditions, that is, the current flowing from winding 23 having a frequency of 75 cycles per minute, insufficient current flows through the tuned circuit and the full-wave rectifier to energize relay 5D which remains in its released position. Since front contact 20 of relay 5H and back contact 21 of relay 5D are then closed, the yellow lamp of the signal 5S is energized and lights to display a caution or approach indication.

If the track current received at this relay end of the section 5T is coded at the 180 code rate, the general condition of the apparatus at this signal location would be similar to that described in the preceding paragraph.

However, the alternating current induced in secondary winding 23 of decoding transformer DT would now have a frequency of 180 cycles per minute. This alternating current when fed into decoding unit 5DU causes sufficient current to flow from the decoding unit to the winding of relay 5D to energize this relay which then picks up. As previously described, the closing of front contacts 20 and 21 of relays 5H and 5D, respectively, completes the circuit for energizing the green lamp of the signal 5S which then lights to display a high speed or clear indication.

With coded track current of either code frequency, that is, the 75 code rate or the 180 code rate, being received through the section 5T, coded energy is supplied to the track section 4T over the supply circuit controlled by a contact of a code transmitter CT. The code transmitter CT shown in Fig. 1 may be any of the well-known forms of code transmitters and is here shown as being of the relay type. As shown, the code transmitter CT operates at a code rate of 180 times per minute, that is, it alternately opens and closes each contact 180 times per minute. However, since it is the presence of coded current and not the actual code frequency which is important in the track section 4T, this code rate may be any of the well-known code rates and may be chosen as desired. The circuit for supplying track current to the section 4T may then be traced from terminal BX of the source through the limiting resistor RA, front contact 180 of code transmitter CT, which contact is being closed at the rate of 180 times per minute, front contacts 12 and 13 of relays 5BSA and 5FSA, and the winding *b* of bond 7 to terminal NX of the source. As was previously indicated, the windings *b* and *a* of the impedance bond 7 act as a track transformer and current induced in the secondary winding *a* is supplied therefrom to the rails of track section 4T. It is obvious from an inspection of the drawings that if no coded current is being received through the track section 5T by the relay 5TR, no current is then supplied to the track section 4T since the front contact 13 of the relay 5FSA would be open.

We shall now assume that as a train passes the signal 5S, one of the insulated joints 3 fails, that is, the insulation breaks down so that the two track sections in that rail are no longer insulated from each other. For purposes of the discussion we shall assume that the joint in the rail 2 is the one that has failed. It is well known that in electrified territory of a railway, because of the impedance bonds, failure of one insulated joint has the same effect as failure of both insulated joints in non-electrified territory. Impulses of signal current supplied to the section to the rear of the defective joint are then also fed to the track relay of the section in advance of the defective joint. In other words, a condition now exists whereby current flowing in the winding *b* of bond 7 will induce a similar current in the windng *b* of bond 6. This is possible due to the closed transformer circuit including the lower half of winding *a* of bond 7, connection 8, the lower half of winding *a* of bond 6, and the rail 2 which, because of the defective insulated joint 3, now forms a completed connection between the lower ends of the two windings.

Thus, when the track section 5T is again unoccupied by a train and a pulse of track current is received by the track relay 5TR, a circuit is completed to supply a pulse of current to winding *b* of bond 7 which will in turn cause the track relay 5TR to hold up. It is to be noted that when the track relay 5TR receives the first pulse of coded current closing its front contact 14, the relay 5FSA is also energized and picks up immediately. This completes a circuit passing from terminal BX through resistor RA, back contact 12 of relay 5BSA, front contact 13 of relay 5FSA, and the winding *b* of bond 7 to terminal NX. The uncoded alternating current then flowing in winding *b* of bond 7 induces, through the previously traced closed transformer circuit, a current flow in winding *b* of bond 6 which causes relay 5TR to remain held up. This locks out the equipment at this location so that only steady energy is supplied to the track section 4T. Since relay 5TR is held up so that front contact 14 remains steadily closed, relays 5H and 5D cannot pick up and signal 5S can display only the red or stop indication.

We shall now assume that the same insulated joint 3 in the rail 2 fails when no train is occupying the stretch of railway track. Under this condition, coded track current is being received through the track section 5T by the relay 5TR. Also coded track current interrupted at the 180 code rate is being supplied to the rails of the track section 4T. Upon the failure of the insulated joint in the rail 2, conditions similar to that previously described are set up, that is, the energy supplied to the track section 4T affects also the track relay 5TR which is normally fed through the track circuit of section 5T. Thus, the impulses of coded energy supplied to section 4T and feeding over the defective insulated joint will combine with the impulses of coded energy supplied through the section 5T and will cause the contacts of the relay 5TR to remain picked up an abnormally large proportion of the time. In other words, the code following operation of the relay 5TR becomes scrambled so that the relay on-time during which the front contacts of the relay 5TR are closed increases beyond the usual amount. As a result of this increase in the time during which the back contacts of 5TR are open, the degree of energization of the winding of relay 5BSA is reduced to a value such that the armature of this relay is released. Release of the armature of the relay 5BSA results in the closing of back contacts of this relay and completes the alternate path for supplying energy to the track section 4T. In other words, since back contact 12 of relay 5BSA bypasses the coding contact 180 of code transmitter CT, steady energy is supplied to the track section 4T. This steady energy, of course, feeds through the transformer circuit established by the defective insulated joint and the track relay 5TR is held steadily energized. This locks out the operation of the various relays associated with the track relay so that relays 5H and 5D release or remain so. This causes the signal 5S to display a red or stop indication. Steady energy continues to be supplied to the track section 4T until such time as the insulated joint in the rail 2 is repaired and normal conditions can be reestablished. Although coded energy contnues to be received through the rails of the track section 5T, the steady energy feeding through the transformer circuit established by the defective insulated joint overrides this coded energy so that no code following operation of the track relay 5TR is possible.

As has been previously indicated, it has been found necessary, especially when the electric propulsion is of the direct current type, to provide a low resistance short circuit across the feed-end impedance bond during the off-period of a code in order to reduce the on-time gain in the track circuit to a reasonable value. This low resistance short circuit is applied across the primary winding of the track transformer, which in this case consists of winding *b* of impedance bond 7. In other words, the winding *b* is short circuited during the off-time of the code through an obvious circuit including front contacts 12 and 13 of relays 5BSA and 5FSA, respectively, and back contact 180 of the code transmitter CT. In one specific case, it was found that without such a low resistance shunt on the primary winding of the track transformer, the on-time gain of the track circuit was too great to provide satisfactory operation of the track relay under all conditions. However, in the same case, with the transformer winding short circuited during the off-time of the code, the track relay on-time gain was halved and was then low enough to provide satisfactory operation under all conditions.

Providing such a low resistance shunt across the primary winding of the impedance bond, however, has created a new problem to be overcome in the detection of a failure of an insulated joint. When an insulated joint has failed, short circuiting the feed-end impedance bond during the off-time of the code transmitter reduces the impedance of the feed-end bond 7 so that it acts as a short circuit on the impedance bond 6 and the track relay 5TR causing the release of the track relay. The track relay thus tends to follow only the code transmitted at the same location, preventing detection of the defective insulated joint when such a failure occurs when no train is occupying the stretch of railway track. In other words, under conditions of an insulated joint failure in the rail 2 when the track stretch is unoccupied, the track relay 5TR, with the low resistance short circuit being applied to winding b of bond 7 during the off-period of the code, tends to follow only the coded energy interrupted at the 180 code rate which is being supplied to the track section 4T, rather than, as described previously, following the scrambled code which results from the combination of the coded energy in both sections. No detection of the failure of the insulated joint can then be accomplished. It would be desirable, therefore, to have the short circuiting contact of the code transmitter CT include in the shunting circuit an element which is of low impedance when the feed-end bond, acting as a track transformer, is feeding a track circuit without a defective insulated joint and which is of high impedance when the insulated joint is defective.

The problem discussed in the preceding paragraph has been solved in our invention by including a non-linear resistance means in the shunting circuit applied to the winding b of bond 7 during the off-time of the coded current in section 4T. This non-linear resistance means provides for proper detection of an insulated joint in the following manner. With the arrangement as shown in Fig. 1, the voltage impressed on the primary winding of the feed-end bond at the far end of section 5T when it is feeding a normal track circuit is, for an example, of the order of 60 to 100 volts. Under these conditions, the relay-end bond requires only approximately 1.0 volt on the track winding, that is, the winding a of bond 6, to pick up, and only about 0.6 volt to hold up, track relay 5TR. When the insulated joint in rail 2 has failed, 0.6 volt impressed on winding a of bond 6 will cause, through the closed transformer circuit previously described, a voltage of approximately 20 volts to appear across winding b of bond 7. If the non-linear resistance means used in the shunting circuit conduits only a little current at 20 volts, that is, has a relatively high resistance, the impedance bond 7 will not be short circuited during the entire off-time of the coded current in section 4T. Bond 7 does not then act as a short circuit on bond 6 and track relay 5TR will be responsive to the coded current received through the rails of section 5T. As was previously discussed, relay 5TR is then operated by a scrambled code. This operation results in the application of steady energy to the track circuit of section 4T which in turn causes the lockout of the apparatus at this signal location.

However, in the present example, the non-linear resistance means chosen must conduct many times more current when any voltage above approximately 40 volts is applied across its terminals, the rate of increase of the current being of the order of, for example, the square of the voltage. The resistance of the shunting circuit will then be low enough to damp the voltage oscillations during the code off-time occurring in bond 7 as a result of the coded track current supplied to section 4T by its normal supply circuit shown in Fig. 1.

If properly chosen, the non-linear resistance in the shunting circuit will provide a low resistance shunt across the feed-end bond to damp out the voltage oscillations which tend to increase the on-time gain of the track circuit beyond a working level. At the same time, the shunting circuit will have a high resistance at such voltage levels as result from the track current in the section in advance through the transformer circuit closed during the period an insulated joint is defective. This high resistance shunt has no effect on the track relay in advance and the desired lock-out action can occur.

In Fig. 1, then, the shunting circuit for the winding b of bond 7 includes a non-linear resistor NL, which may be of the well-known Thyrite type resistor, the actual resistor being chosen to have the proper voltage limits for the circuit in which it is to be used. It is to be understood, however, that our invention is not limited to the use of a Thyrite resistor for the non-linear resistance means but that other such non-linear resistors or devices may be used. The shunting circuit may be traced from the lower end of winding b of bond 7 through front contact 13 of relay 5FSA, front contact 12 of relay 5BSA, back contact 180 of code transmitter CT, the non-linear resistor NL, and returning to the upper end of winding b.

Referring now to Fig. 2, there is shown therein an energy supply circuit for the track section 4T which is identical with that shown in Fig. 1, except that a rare gas tube has replaced the non-linear resistance NL. Rare gas tubes have resistance characteristics which provide results equivalent to those obtained when non-linear resistors of the Thyrite type are used, that is, they have low impedance when high voltage is applied across their terminals, but below a selected voltage, their resistance increases to a high level. In the circuit of Fig. 2, the rare gas tube chosen for such operation should have the characteristics of very low impedance when approximately 40 volts or more is applied across its terminals, and high impedance if the applied voltage is less than 40 volts. This would result in operation similar to that previously described. In other words, when the insulated joints at this location are in good condition so that the oscillations across the winding b of bond 7 during the off-period of the code are of high voltage, a low resistance shunt is applied to keep down the on-time gain in track circuit 4T. If one of the insulated joints at this location has failed so that low voltage oscillations occur in winding b of bond 7 during the off-period of the code, a high resistance shunt is applied across the winding which has no effect on the operation of the track relay 5TR in following the scrambled code, which operation results in the lockout of the apparatus at this signal location.

Although we have herein shown and described only one form with one modification of railway traffic controlling apparatus employing our invention, it is to be understood that various changes and modifications may be made therein within the scope of the appended claims without departing from the spirit and scope of our invention.

Having thus described our invention, what we claim is:

1. In railway traffic controlling apparatus employing a plurality of coded track circuits and a plurality of wayside signals, each said coded track circuit including a code following track relay means and a source of coded alternating track circuit current of a selected frequency; at each signal location the combination comprising, a first repeater relay controlled by a front contact of the associated track relay and adapted to remain picked up if repeatedly energized by coded pulses of energy over said track relay front contact, a second repeater relay controlled by a back contact of said track relay and a front contact of said first relay and adapted to remain picked up if repeatedly energized by coded pulses of energy over said track relay back contact, a code transmitter operable at a selected code rate, a supply circuit for the track circuit to the rear of that signal including a first path comprising the alternating current source for the particular signal location, a front contact of said code transmitter, and a front contact of each said repeater relay; a second path comprising said source, a back contact of said second repeater relay, and a front contact of said first repeater relay; and a shunting circuit for said rearward track circuit including front contacts of said repeater relays, a back contact of said code transmitter, and a non-linear resistance means having a relatively low impedance only above a preselected voltage level.

2. In traffic controlling apparatus for an electric railway, including a plurality of coded track circuits, a plurality of wayside signals each capable of displaying a plurality of indications, and impedance bond connections between adjacent track circuits, each coded track circuit including a source of current of a selected frequency, a secondary and a primary winding of the relay-end impedance bond, and a code following track relay means, each relay-end impedance bond having also a third winding tuned to said selected frequency; a supply means for each coded track circuit including a first circuit path comprising the current source for the circuit, a first coding contact closed periodically at a selected code rate, a first contact closed when the track relay means for the track circuit next in advance is steadily energized or is energized at any code rate, a second contact closed only when said advance track relay means is energized at a normal periodic code rate, and a primary winding of the feed-end impedance bond; a second circuit path comprising said source, said first contact, a third contact closed when said advance track relay means is steadily energized or is energized at a code rate having a high on-time, and said feed-end bond primary winding; and a third circuit path comprising said first and second contacts, a second coding contact closed during the open time of said first coding contact, a non-linear resistance means having a relatively low impedance only above a preselected voltage level, and said feed-end bond primary winding.

3. In traffic control apparatus for a stretch of railway track which is divided into a plurality of insulated track sections, each track section being provided with a coded track circuit supplied with coded current of a selected frequency fed from one end of said section and received at the relay end of the section by a code following relay means, adjacent sections being joined together into a continuous circuit for current of another frequency by impedance bonds tuned to said selected frequency; a shunting circuit at the feed-end of each track circuit comprising a primary winding of the feed-end impedance bond, two contacts simultaneously closed only when the track relay means for the track circuit next in advance is receiving current properly coded, another contact closed during the off-period of said coded current for the particular track section, and a non-linear resistance means having a relatively low impedance only above a preselected voltage level.

4. In traffic control apparatus for a stretch of railway track which is divided into a plurality of insulated track sections, each track section being provided with a coded track circuit supplied with coded current of a selected frequency fed from one end of said section and received at the relay end of the section by a code following relay means, adjacent sections being joined together into a continuous circuit for current of another frequency by impedance bonds tuned to said selected frequency; means at the feed end of each track circuit to shunt the track circuit during the off-period of the coded current for the particular track circuit only if the insulation between the particular track circuit and the track circuit next in advance is complete, said means including a coding contact closed during the off-period of said particular coded current and a non-linear resistance means having a relatively low impedance only above a preselected voltage level.

5. In traffic control apparatus for a stretch of railway track which is divided into a plurality of insulated track sections, each track section being provided with a coded track circuit supplied with coded current of a selected frequency fed from one end of said section and received at the relay end of the section by a code following relay means, adjacent sections being joined together into a continuous circuit for current of another frequency by impedance bonds tuned to said selected frequency; a shunt circuit at the feed end of each track circuit comprising a primary winding of the feed-end impedance bond, two contacts simultaneously closed only when the track relay means for the track circuit next in advance is receiving coded current having approximately equal on and off-times, another contact closed during the off-period of said coded current for the particular track circuit, and a non-linear resistor having relatively low resistance only when a voltage above a preselected level is applied across said non-linear resistor.

6. In traffic control apparatus for a stretch of railway track which is divided into a plurality of insulated track sections, each track section being provided with a coded track circuit supplied with coded current of a selected frequency fed from one end of said section and received at the relay end of the section by a code following relay means, adjacent sections being joined together into a continuous circuit for current of another frequency by impedance bonds tuned to said selected frequency; a shunt circuit at the feed end of each track circuit comprising a primary winding of the feed-end impedance bond, two contacts simultaneously closed only when the track relay means for the track circuit next in advance is receiving a coded current having its on-time and off-time approximately equal, another contact closed during the off-period of said coded current for the particular track circuit, and a rare-gas tube having a preselected breakdown voltage.

7. In traffic controlling apparatus for an electric railway, including a plurality of coded track circuits, a plurality of wayside signals each capable of displaying a plurality of indications, and impedance bond connections between adjacent track circuits, each coded track circuit including a source of current of a selected frequency, a secondary and a primary winding of the relay-end impedance bond, and a code following track relay means, each relay-end impedance bond having also a third winding tuned to said selected frequency; a supply means for each coded track circuit including a first path comprising the current source for the particular circuit, a first coding contact closed periodically at a selected code rate, a first contact closed when the track relay means for the track circuit next in advance is steadily energized or is energized at any code rate, a second contact closed only when said advance track relay means is energized at a normal periodic code rate, and a primary winding of the feed-end impedance bond; a second path comprising said source, said first contact, a third contact closed when said advance track relay means is steadily energized or is energized at a code rate having a high on-time, and said feed-end bond primary winding; and a third path comprising said first and second contacts, a second coding contact closed during the open time of said first coding contact, said feed-end bond primary winding, and a non-linear resistor having a relatively low resistance only when a voltage above a preselected level is applied across said resistor.

8. In traffic controlling apparatus for an electric railway, including a plurality of coded track circuits, a plurality of wayside signals each capable of displaying a plurality of indications, and impedance bond connections between adjacent track circuits, each coded track circuit including a source of current of a selected frequency, a secondary and a primary winding of a relay-end impedance bond, and a code following track relay means, each relay-end impedance bond having also a third winding tuned to said selected frequency; a supply means for each coded track circuit including a first path comprising the current source for that particular circuit, a first coding contact closed periodically at a selected code rate, a first contact closed when the track relay means for the track circuit next in advance is steadily energized or is energized at any code rate, a second contact closed only when said advance track relay means is energized at a normal periodic code rate, and a primary winding of the feed-end impedance bond; a second path comprising said source, said first contact, a third contact closed when said advance track relay means is steadily energized or is energized at a code rate having a high on-time, and said feed-end bond primary winding; and a third path comprising said first and second contacts, a second coding contact closed during the open time of said first coding contact, said feed-end bond primary winding, and a rare-gas tube having a preselected breakdown voltage.

9. In combination with a coded alternating current track circuit for railway traffic controlling apparatus, said track circuit including a section of the rails of the railway, a track transformer having its secondary winding connected across said rails, and a supply means comprising a source of current of selected frequency, a coding contact periodically closed at a selected code rate, and the primary winding of said track transformer; a shunting circuit for said track circuit comprising in series said primary winding, another contact closed during the open time of said coding contact, and a non-linear resistance means having a relatively low impedance only above a preselected voltage level.

10. In combination with a coded alternating current track circuit for railway traffic controlling apparatus, said track circuit being similar to a plurality of consecutive track circuits and including a section of the rails of the railway, a code following track relay, a track transformer having its secondary winding connected across said rails, and a supply means comprising a source of current of a selected frequency, a coding contact periodically closed at a selected code rate, and the primary winding of said track transformer; a shunting circuit for said track circuit comprising in series said primary winding, two contacts simultaneously closed only when the track relay for the track circuit next in advance is operated by normal on-time coded energy, another contact closed during the open time of said coding contact, and a non-linear resistance means having a relatively low impedance only above a preselected voltage level.

11. In combination with a coded alternating current track circuit for railway traffic controlling apparatus, said track circuit being similar to a plurality of consecutive track circuits and including a section of the rails of the railway, a code following track relay, a track transformer having its secondary winding connected across said rails, and a supply means comprising a source of current of a selected frequency, a coding contact periodically closed at a selected code rate, and the primary winding of said track transformer; a shunting circuit for said track circuit comprising in series said primary winding, two contacts simultaneously closed only when the track relay for the track circuit next in advance is operated by normal on-time coded energy, another contact closed during the open time of said coding contact, and a non-linear resistor having a relatively low resistance only above a preselected level of the applied voltage.

12. In combination with a coded alternating current track circuit for railway traffic controlling apparatus, said track circuit being similar to a plurality of consecutive track circuits and including a section of the rails of the railway, a code following track relay, a track transformer having its secondary winding connected across said rails, and a supply means comprising a source of current of a selected frequency, a coding contact periodically closed at a selected code rate, and the primary winding of said track transformer; a shunting circuit for said track circuit comprising in series said primary winding, two contacts simultaneously closed only when the track relay for the track circuit next in advance is operated by normal on-time coded energy, another contact closed during the open time of said coding contact, and a rare-gas tube having non-linear resistance characteristics and effective to provide a relatively low resistance path only above a preselected level of the applied voltage.

References Cited in the file of this patent

UNITED STATES PATENTS

| 1,662,444 | Tegeler | Mar. 13, 1928 |
| 1,770,705 | Lucas | July 15, 1930 |
| 2,018,241 | Viele | Oct. 22, 1935 |
| 2,098,833 | Peter | Nov. 9, 1937 |
| 2,243,725 | Allison | May 27, 1941 |
| 2,617,921 | Chi Chang Chu | Nov. 11, 1952 |